Patented Apr. 27, 1943

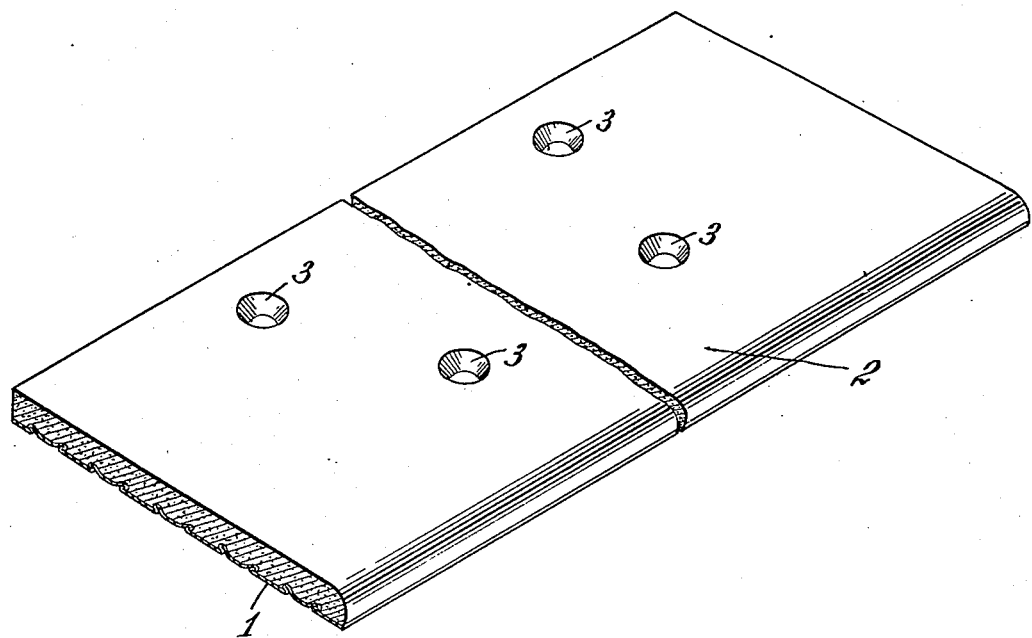

2,317,960

UNITED STATES PATENT OFFICE 2,317,960

MANUFACTURE OF TREADS

William H. Sayre, Essex Fells, N. J., assignor to American Abrasive Metals Company, Irvington, N. J., a corporation of New York Application March 31, 1941, Serial No. 386,081

8 Claims. (Cl. 94—5)

This invention relates to improvements in the manufacture of non-slip, wear-resistant treads adapted for pedestrian and other traffic, such as treads on steps and stairways, tread surfaces for floors, ramps, walks, runways, running boards, platforms, etc., comprising abrasive particles bonded by resinous material.

This application is in part a continuation of my prior application Serial No. 202,581, filed April 18, 1938.

The treads consist of abrasive particles bonded together by suitable hard, synthetic resinous or plastic materials and one or more fibrous materials, together with pigments, fillers, etc., if desired, the treads, when properly made, as hereinafter explained, combining high resistance to wear, high resistance to moisture, non-slip characteristics until quite completely worn away, capability of being produced in various attractive colors and designs, resistance to shattering or cracking, high impact and flexural strength, high water-resistance and absence of cold or plastic flow.

The treads may vary somewhat in their composition but in general they will contain abrasive or abrasion-resisting particles together with fibrous materials suitably bonded to give a hard, dense, moisture-resistant and long-wearing tread. The abrasive particles are advantageously bonded together with a synthetic resin binder which is heat hardenable and which in a heat-hardened state gives, with the other constituents of the tread, a tread capable of withstanding shocks and vibration and also substantially free from cold flow under normal service conditions.

Different abrasion resisting materials can be employed in making the treads as will be readily understood and the size and proportion of abrasive grains can also be somewhat varied as can also the nature and proportions of fibrous materials, etc.

In order to obtain a sufficiently uniform mixture of the tread composition, it is advantageous to use a part at least of the resin binder in liquid form and subject the grains and fiber to prewetting therewith before compounding with other constituents such as fillers and powdered resin. When a liquid resin and a powdered resin are both used, the proportions can be somewhat varied, but the liquid resin is desirably used for prewetting the grains and fiber in amount sufficient for that purpose.

The resins used should be such as will impart the necessary bonding action to the grains and to admixed fibers, fillers, etc. to insure a dense, water-resistant tread after molding. The nature of the resins should also be such as will prevent undesirable flowing or cold flow of the finished tread and also avoid undue brittleness. The liquid and powdered resins, when used, may both be thermo-reactive or thermo-setting resins or should be of such nature and proportions that when subjected to heat hardening either during or after molding the hardened composition will have the desirable properties above mentioned.

The treads having the desirable characteristics above referred to may be produced by either hot pressing or cold pressing methods. With either method the abrasive material and the fibrous material are advantageously prewet with a liquid thermo-setting resin, e. g., a liquid "A" stage phenolic resin followed by admixture of the prewetted fibrous and abrasive materials with powdered resins, e. g., a "B" stage phenolic resin along with coloring material, inert pigments and the like. In cold pressing, the mixture is pressed to the desired form and baked at a sufficiently high temperature for a sufficient period of time to cause the reactive resin to change to the permanent infusible and unreactive state, coalescing the entire mixture to a homogeneous, dense hard mass having high impact and flexural strength, freedom from cold flow, etc.

For hot pressing the composition is subjected to heat and pressure at the same time. At the higher temperatures the solid resin may melt or fuse with the liquid resin and facilitate the thorough intermixture and wetting of the other ingredients. With the hot pressing method the quantity of liquid resin used is advantageously considerably less than the amount used in the cold pressing method. Or, alternatively, the proportion of fibrous materials or inert fillers and the like may be greatly increased.

Regardless of which method is used, the final product is one in which the abrasive materials are firmly bonded together by a hard, synthetic resinous bonding material including fibrous material which has also been thoroughly wetted by the resinous material, so that the final product is not characterized by a lack of resistance to impact or of flexural strength which has been characteristic of products previously known; and, because of the proper selection of the bonding material, is not subject to the cold or plastic flow which has been so objectionable in tread surfaces made from such materials as asphalt or mastic.

Advantageously, the treads are reinforced with metal backings such as channeled metal backings, wire mesh or other form of reinforcement, although for special purposes, such as floor tiles or the like, particularly where they are to be permanently set in concrete or other foundation material, such reinforcement may be unnecessary, and burlap or other fabric may be used with advantage.

In producing the treads, various types of abrasive materials may be used, such as aluminum oxide, boron carbide, silicon carbide, ceramic bonded aluminum oxide granules, sand, flint, etc. In general, it is advantageous to have the abrasive material in sizes ranging from 20 to 60 mesh, although coarser or finer material may be used. The proportion of abrasive material may be varied over a wide range, for example, from as little as 10% to as much as 80% or more. Wear resistance is, roughly, proportional to the abrasive content, and to the quality of the abrasive used, such abrasives as aluminum oxide giving greater wear than the inexpensive abrasives such as flint or sand.

The type and quantity of synthetic resin, the effective bonding agent, also may be widely varied. Somewhere around 12 to 20% of resin is advantageously used, although the amount of resin may be much less than this, for example, 8% or even less, or much greater than this, for example, as much as 50% or more.

The proportions of liquid resin and solid resin used can also be varied depending upon the proportions of other ingredients. A proportion of 2 parts of liquid resin to 14 parts of dry, powdered resin has given excellent results, but these proportions can be somewhat varied. With too high a proportion of liquid resin, the mixture may become tacky or tend to ball up or give difficulty in handling in pressing or molding. To avoid difficulties in processing and compounding the amount of liquid resin used is ordinarily as small as will effectively prewet the abrasive and fibrous materials. The proportion of liquid resin may thus vary in making different treads from e. g., 0.75% to e. g., 2.5%.

The two types of resins used, e. g., liquid and powdered resins, are thermo-setting resins or react by thermo-setting to give an appropriate bond for the tread. Thermo-setting liquid resins, that is, resins which on heating are converted to a hard, infusible condition, such as "A" stage phenolic resins or alkyd resins, are advantageously used, but thermo-plastic resins such as the vinyl chloride-vinyl acetate resins may be used, particularly if adequately plasticized with some such material as tricresyl phosphate.

The amount of the powdered resin used may also be varied so that the total amount of resin is somewhere between 8% to 50%, advantageously 12% to 20%. The use, for example, of 14 parts of dry resin with two parts of liquid resin gives good results. With the powdered resins also, thermo-setting resins, such as a "B" stage phenolic resin or an alkyd resin are advantageously used, but thermo-plastic resins such as the vinyl chloride-vinyl acetate resins may be used. The resins used are synthetic resins of the type which, at least when at normal temperatures, are hard and rigid and relatively free from cold or plastic flow.

Similarly, the amount and type of fibrous material may be widely varied. The most satisfactory fibrous material, for the production of high grade treads, which I have yet found is asbestos, although other fibrous materials, such as wood flour, linters, etc., may be used. The quantity of fibrous material used may also be varied over a wide range. Asbestos, for example, may be used in proportions ranging from 8% or less to as much as 50% or even more, depending upon the quality and cost of the product desired. Increasing the proportion of asbestos increases the flexibility and strength of the treads, but tends to decrease the wearing qualities because of the accompanying decrease in the proportion of abrasive material. The use of relatively large proportions of asbestos depends upon the use of the liquid resin for prewetting the abrasive material, as unless the abrasive material is prewetted with the liquid resin, a homogeneous product containing substantial amounts of asbestos cannot be produced. Other fibrous materials, such as wood flour, may also be used in widely varied proportions; but large quantities of wood flour will ordinarily only be used in the cheaper grades of products, or where treads of light weight are desired.

For coloring the final product, various coloring pigments, such as red iron oxide, carbon black, zinc oxide, etc., may be used in such quantities as are required to give the desired color to the final product.

Inert fillers, such as whiting, may also be included. Where the treads are made by a cold pressing operation, the amount of such inert filler which may be used is relatively limited, because with such fillers, it is necessary to increase the proportion of liquid resin to an amount sufficient to bind the inert material as well as the fibrous material and the abrasive material after pressing and prior to baking, and with the inclusion in the product of too much of the liquid resin, difficulties are encountered in processing because of the tendency of the product to flow in the baking operation. Where the products are produced by a hot pressing operation, the amount of filler can be considerably increased, and for this reason the materials produced by hot pressing may be considerably cheaper than the products produced by cold pressing operations, although usually, because of the inclusion of filler, of lower quality.

The invention will be illustrated by the following examples, but it is not limited thereto.

*Example 1.*—74 parts of aluminum oxide abrasive (Aloxite), 20 to 60 mesh, are mixed with 1.5 parts of a liquid, reactive phenolic resin (Resinoid A). 8 parts of asbestos fibers (½ inch) are then added and the mixing is continued until both the abrasive material and the asbestos are wet by the liquid resin. 2 parts of red iron oxide, and 14.5 parts of a powdered reactive phenolic resin (Resinoid B) are then added and the entire mass is subjected to further mixing until homogeneous. The temperatures and other conditions of mixing should be adjusted to give the best results with whatever ingredients are used, more viscous resins being advantageously used at higher temperatures and less viscous resins at lower temperatures.

After the material has been thoroughly admixed the proper amount is placed in a mold, superimposed upon a suitable backing or reinforcing member, such as corrugated sheet steel or the like, and formed by pressing, for example, at 10,000 pounds per square inch, for a short time. The pressed article is then removed from the mold and baked in a frame which produces a reverse warp so that when the resin shrinks on cooling the article assumes a flat position instead of becoming concave, due to the greater shrinkage of the resinous material as compared with the metal backing. The time and temperature of baking will be whatever is required to convert the particular resin used to the finished state.

While with some compositions cold molding and subsequent baking will produce a satisfactory product, it is in general more advantageous to subject the composition to hot molding which may be only for a short period of time after which the molded tread may be removed from the mold and subjected to a baking operation to further harden the resin binder.

Instead of first molding the tread and subsequently baking it, the complete baking operation can be carried out in the same hot press used for molding, e. g., by molding the article in the heated press at 10,000 pounds pressure for a sufficient time; or the hardening may be in part carried out in the mold and finished by subsequent baking.

In the above example, instead of using Aloxite grains as the abrasive other abrasive grains can be used such as flint, silica, etc.

Where the tread is made with resin, abrasive, fibrous material and color without any large admixture of filler, the procedure followed is advantageously that of Example 1 with mixing of abrasive resisting grains and liquid resins together, e. g., for 2 minutes followed by addition of the asbestos and continued mixing, e. g., for 5 minutes to prewet the fiber after which the powdered resin iron oxide or other colors are added together and the mixture continued for a sufficient time, e. g., 5 minutes, to bring about substantially homogeneous intermixing.

When a mixed compound used for making the treads contains fillers in addition to the ingredients mentioned above, the mixing procedure can be somewhat modified such that the grain and liquid resin are first mixed and the other ingredients including the fillers separately mixed, followed by adding the wetted grain gradually and effecting further admixture.

Example 2.—25 parts of abrasive grains such as silica, flint, aluminum oxide (Aloxite), etc., ranging in size from 20 to 80 mesh, are mixed with 2 parts of a liquid thermo-setting resin. 10 parts of asbestos fiber (about ½ inch) are separately mixed with 41 parts whiting, 14 parts of a powdered thermo-setting resin and 8 parts of red iron oxide. The two mixtures are then admixed, with gradual addition of the coated abrasive particles to effect thorough admixture, then placed in a mold on top of a suitable backing member and pressed at a temperature of around 350° F. and 10,000 pounds pressure for a few minutes, e. g., from 4 to 15 minutes depending upon the type of resin used. If a fast curing resin is used, the article may be completely cured during the pressing operation; while if a slow curing resin is used additional baking may be required. Upon removal from the mold, if the tread has a metal backing, it is placed on a convex form to produce a reverse warp somewhat in excess of the warp which would be produced by the difference in shrinkage of the resin and the metal backing. As a result, when the tread cools, it retains a slight reverse warp, that is, is slightly convex. It is then run through rollers and straightened after thorough cooling, giving a tread which is flat and free from strain. This method of cooling and straightening is somewhat simpler than the method described in Example 1, because it is not necessary to provide a form for each tread during the baking operation, and it is not necessary to adjust the degree of reverse warping to exactly compensate for the shrinkage. The presence, in the tread, of the fibrous material, imparts sufficient flexibility to permit the bending or rolling of the tread from a slightly convex to a flat shape.

Example 3.—50 parts of abrasive grains, e. g., 25 parts of silica abrasive and 25 parts of aluminum oxide abrasive, are mixed with 2 parts of a liquid thermo-setting resin, 10 parts of asbestos fiber, 16 parts of whiting, 14 parts of solid resin and 8 pounds of red iron oxide are then separately mixed and the coated abrasive grains added and the operation otherwise carried out in a manner similar to that described in Example 2.

Instead of using 50 parts of abrasive grains as in Example 3, a smaller amount of abrasive material may be used, e. g., 25 parts, and an increased amount of fibrous material, e. g., 25 parts of wood flour in addition to the 10 parts of asbestos of Example 3.

Example 4.—In some cases a liquid thermo-setting resin can be used without admixture of powdered resin. Thus 462 parts of aluminum oxide abrasive grains (Aloxite) may be used with 100 parts of liquid thermo-setting resin (Resinoid A), 132 parts of asbestos fiber and 32 parts of iron oxide. Or 100 parts of abrasive grain can be used with 100 parts of resin together with 110 parts of whiting, 150 parts of asbestos fiber and 40 parts of iron oxide. Or an increased amount of filler can be used, e. g., 210 parts of whiting with 100 parts of abrasive grain, 40 parts of asbestos fiber, 50 parts of iron oxide and 100 parts of liquid thermo-setting resin. When only a liquid thermo-setting resin is used, the proportions of abrasive grains, fillers, fibrous material, etc., can be varied and the mixing and molding operations should be carried out under conditions to insure pressing and hardening of the thermo-setting resin to produce the final molded tread.

In the foregoing examples, the tread material has been applied directly to the metal backing, if a metal backing is used. Other types of backings, such as burlap, wire mesh, etc., may be used, particularly for tiles which are to be set in cement or the like. For stair treads or treads to be applied over surfaces which may be somewhat irregular, it is advantageous to use the metal backing to increase the structural strength and to prevent undue strains on the bonding material because of surface irregularities. Where backing material such as corrugated sheet steel is used, it is advantageous to subject it to sandblasting or the like to improve the bond between the resin and the metal; and in some cases it is advantageous to use an intermediate bonding layer of a thermo-plastic resin, rubber, or the like, either to provide sound deadening, better bonding, or for other purposes. The application of Homer H. Bashore, Serial No. 386,076, filed March 31, 1941, describes backings for treads, and methods of producing treads with backings, which may be used with advantage in producing the treads.

A tread typical of those described in the said Bashore application is illustrated in the appended drawing. In the tread illustrated in the drawing there is provided a metal backing 1 and a tread material 2, the tread material being of the type previously discussed. Such a tread is readily produced by applying a suitable tread mixture to a corrugated or channeled sheet metal backing, and subjecting it to hot pressing, whereby the channels in the backing are flattened out more or less as shown in the attached drawing forming an interlock with the tread material.

I claim:

1. The method of forming a non-slip, wear-resistant tread which comprises wetting abrasive-resistant particles with liquid resin, mixing the wetted abrasive-resistant particles with powdered resin and fibrous material, and curing said mixture to provide a hard tread surface of synthetic resin having abrasive-resistant particles and fibrous material embedded therein and bonded thereto.

2. The method of forming a non-slip, wear-resistant tread which comprises wetting abrasive-resistant particles with liqud resin, mixing the wetted abrasive-resistant particles with fibrous material, then mixing the resultant mixture of abrasive-resistant particles and fibrous material with powdered resin, and curing the final mixture to provide a hard tread surface of synthetic resin having abrasive-resistant particles and fibrous material embedded therein and bonded thereto.

3. The method of forming a non-slip, wear-resistant tread which comprises wetting abrasive-resistant particles with liquid resin, mixing fibrous material with liquid resin, mixing the wetted abrasive-resistant particles and the wetted fibrous material, mixing the resulting mixture of abrasive-resistant particles and fibrous material with powdered resin, and curing the final mixture to provide a hard tread surface of synthetic resin having abrasive-resistant particles and fibrous material embedded therein and bonded thereto.

4. The method of forming a non-slip, wear-resistant tread which comprises wetting abrasive-resistant particles with liquid thermo-setting resin, mixing the wetted abrasive-resistant particles with powdered thermo-setting resin and fibrous material, and curing said mixture under heat and pressure to provide a hard tread surface of synthetic resin having abrasive-resistant particles and fibrous material embedded therein and bonded thereto.

5. The method of forming a non-slip, wear-resistant tread which comprises wetting abrasive-resistant particles with liquid thermo-setting resin, mixing fibrous material with liquid thermo-setting resin, mixing the wetted abrasive-resistant particles and the wetted fibrous material, mixing the resulting mixture of abrasive-resistant particles and fibrous material with powdered thermo-setting resin, and curing the final mixture under heat and pressure to provide a hard tread surface of synthetic resin having abrasive-resistant particles with liquid resin, mixing the therein and bonded thereto.

6. The method of forming a non-slip, wear-resistant tread which comprises wetting abrasive-resistant particles with liquid resin, mixing the wetted abrasive-resistant particles with powdered resin and asbestos fiber, and curing said mixture to provide a hard tread surface of synthetic resin having abrasive-resistant particles and asbestos fiber embedded therein and bonded thereto.

7. The method of forming a non-slip, wear-resistant tread which comprises wetting abrasive-resistant particles with liquid resin, mixing the wetted abrasive-resistant particles with asbestos fiber, then mixing the resultant mixture of abrasive-resistant particles and asbestos fiber with powdered resin, and curing the final mixture to provide a hard-tread surface of synthetic resin having abrasive-resistant particles and asbestos fiber embedded therein and bonded thereto.

8. The method of forming a non-slip, wear-resistant tread which comprises wetting abrasive-resistant particles with liquid heat-reactive resin, mixing the wetted abrasive-resistant particles with powdered heat-reactive resin and fibrous material, and curing said mixture to provide a hard tread surface of synthetic resin having abrasive-resistant particles and fibrous material embedded therein and bonded thereto.

WILLIAM H. SAYRE.

CERTIFICATE OF CORRECTION.

Patent No. 2,317,960.  April 27, 1943.

WILLIAM H. SAYRE.

It is hereby certified that error appears in the printed specification of the above numbered patent requiring correction as follows: Page 4, second column, line 15, claim 5, for "resistant particles with liquid resin, mixing the" read --resistant particles and fibrous material embedded--; and that the said Letters Patent should be read with this correction therein that the same may conform to the record of the case in the Patent Office.

Signed and sealed this 22nd day of June, A. D. 1943.

(Seal)
Henry Van Arsdale,
Acting Commissioner of Patents.